(12) United States Patent
Ono

(10) Patent No.: US 9,172,864 B2
(45) Date of Patent: Oct. 27, 2015

(54) IMAGING DEVICE WITH AUTOFOCUS OPERATION

(75) Inventor: Hideharu Ono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 14/238,473

(22) PCT Filed: Sep. 13, 2011

(86) PCT No.: PCT/JP2011/070872
§ 371 (c)(1),
(2), (4) Date: Feb. 11, 2014

(87) PCT Pub. No.: WO2013/038504
PCT Pub. Date: Mar. 21, 2013

(65) Prior Publication Data
US 2014/0198246 A1    Jul. 17, 2014

(51) Int. Cl.
| | | |
|---|---|---|
| *H04N 5/232* | (2006.01) | |
| *G02B 7/36* | (2006.01) | |
| *G02B 7/28* | (2006.01) | |
| *G03B 13/36* | (2006.01) | |

(52) U.S. Cl.
CPC ............ *H04N 5/23212* (2013.01); *G02B 7/282* (2013.01); *G02B 7/365* (2013.01); *G03B 13/36* (2013.01)

(58) Field of Classification Search
CPC .... H04N 5/23212; G02B 7/282; G02B 7/365; G03B 13/36
USPC ......................................... 348/349, 353–356
See application file for complete search history.

(56) References Cited

U.S. PATENT DOCUMENTS

| | | | | |
|---|---|---|---|---|
| 6,832,729 | B1 * | 12/2004 | Perry et al. ............... | 235/472.01 |
| 7,053,953 | B2 * | 5/2006 | Belz et al. ..................... | 348/346 |
| 2009/0195668 | A1 * | 8/2009 | Koh ........................... | 348/222.1 |
| 2009/0303438 | A1 * | 12/2009 | Yamada et al. ............... | 351/206 |

FOREIGN PATENT DOCUMENTS

| | | |
|---|---|---|
| JP | 07-007650 A | 1/1995 |
| JP | 2005-122016 A | 5/2005 |
| JP | 2006-064970 A | 3/2006 |
| JP | 2006-301031 A | 11/2006 |

* cited by examiner

*Primary Examiner* — Sinh Tran
*Assistant Examiner* — Mark Monk
(74) *Attorney, Agent, or Firm* — Miles & Stockbridge P.C.

(57) ABSTRACT

An imaging device that images a subject includes a focus lens group that collects a light beam from the subject and forms an image of the subject, a focus motor that drives the focus lens group in the optical axis direction, and an imaging element that performs photoelectric conversion of the light beam and outputs a video signal. The imaging device further includes a contrast signal generator that generates and outputs a lower-frequency contrast signal from a luminance component of the video signal, an AF processor that employs the lower-frequency contrast signal as an auto focus evaluation value and moves the focus lens group to the in-focus position with wobbling the focus lens group, and a histogram signal generator that generates and outputs a high-luminance pixel count of the video signal. The AF processor varies the amplitude of the wobbling of the focus lens group based on the high-luminance pixel count.

9 Claims, 9 Drawing Sheets

(COMMENT TEXT: CONFIGURATION OF IMAGING DEVICE OF PRESENT EMBODIMENT)

(COMMENT TEXT: AF OPERATION EXAMPLE FOR NORMAL SUBJECT IN PRESENT EMBODIMENT)

FIG. 3
(COMMENT TEXT: AF OPERATION EXAMPLE WHEN FOCUS LENS GROUP IS DISTANT FROM IN-FOCUS POSITION FOR SUBJECT HAVING POINT LIGHT SOURCE IN PRESENT EMBODIMENT)
(a) 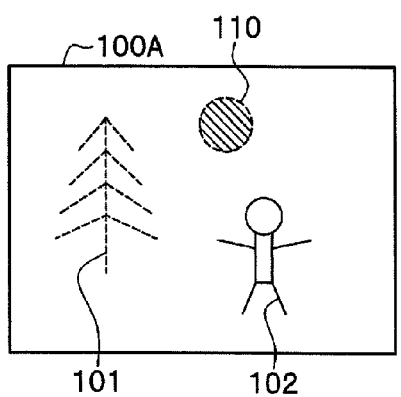
(b) 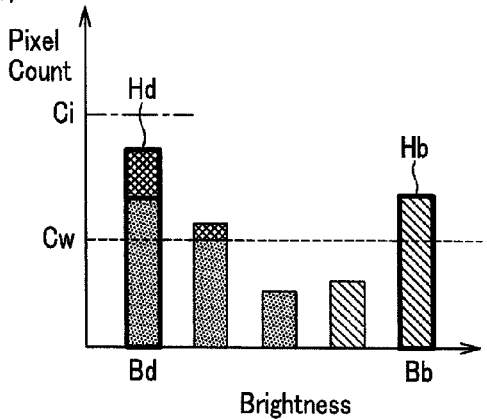
(c) 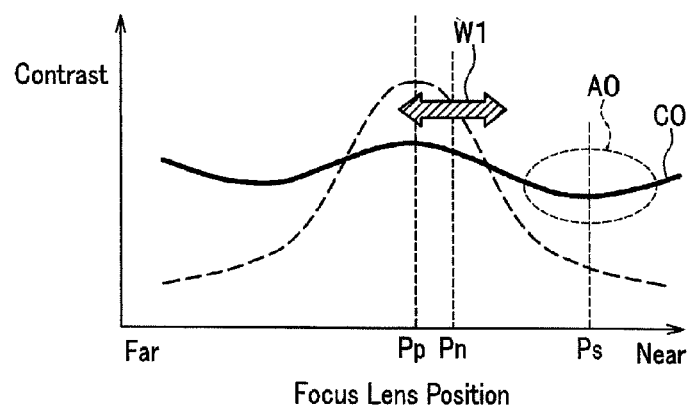
(d) 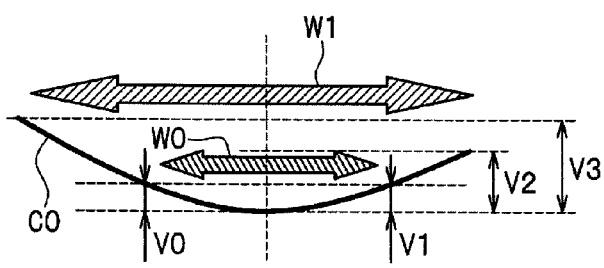

(COMMENT TEXT: AF OPERATION EXAMPLE NEAR IN-FOCUS POSITION FOR SUBJECT HAVING POINT LIGHT SOURCE IN PRESENT EMBODIMENT)

FIG. 5
(COMMENT TEXT: AF OPERATION EXAMPLE WHEN FOCUS LENS GROUP IS DISTANT FROM IN-FOCUS POSITION FOR SUBJECT ON WHICH INFLUENCE OF POINT LIGHT SOURCE IS STRONG IN PRESENT EMBODIMENT)
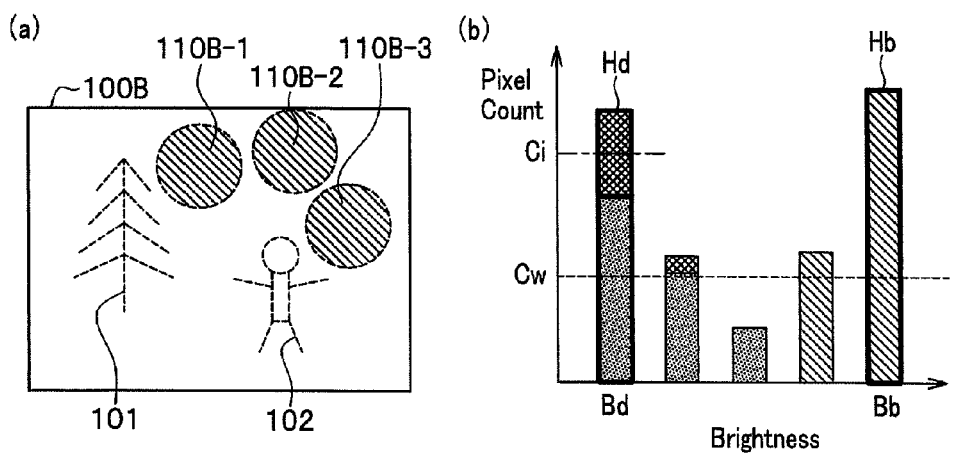
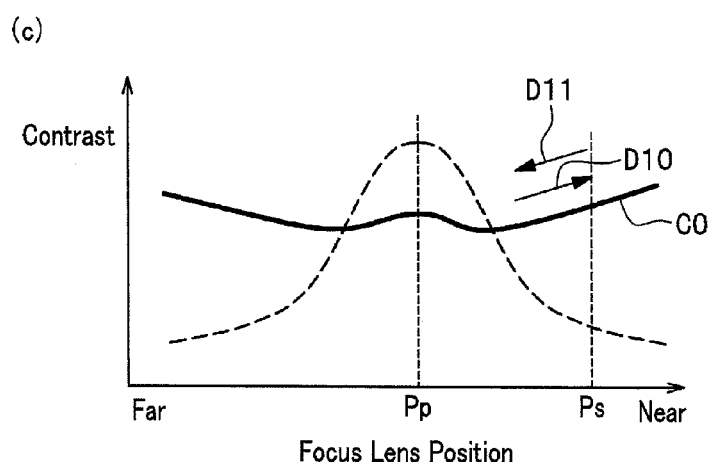

(COMMENT TEXT: AF OPERATION EXAMPLE NEAR IN-FOCUS POSITION FOR SUBJECT ON WHICH INFLUENCE OF POINT LIGHT SOURCE IS STRONG IN PRESENT EMBODIMENT)

FIG. 7
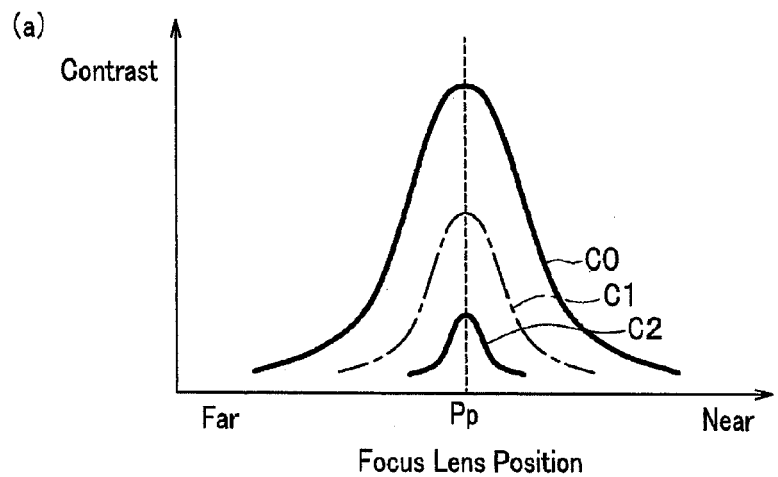
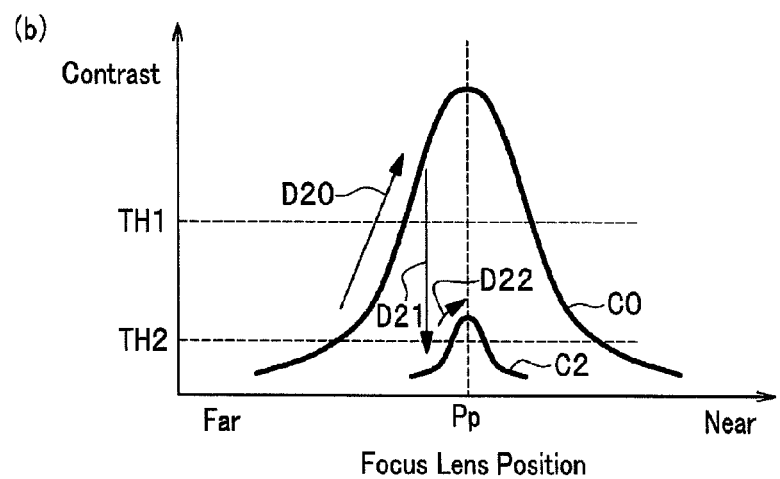
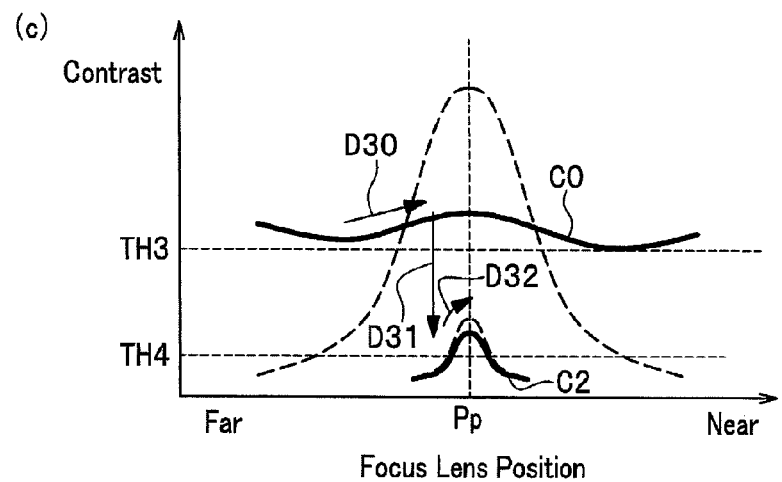

(COMMENT TEXT: CONTROL OF WOBBLING AMPLITUDE AND LENS MOVEMENT DIRECTION IN PRESENT EMBODIMENT)

IMAGING DEVICE WITH AUTOFOCUS OPERATION

TECHNICAL FIELD

The present invention relates to an imaging device having an auto focus function.

BACKGROUND ART

In recent years, many imaging devices such as surveillance cameras and camcorders are equipped with an auto focus function to automatically adjust focus. Hereinafter, the auto focus is described as "AF" in drawings.

In the camera equipped with the auto focus function, a focus lens is automatically controlled to an in-focus position of a subject when the subject is out of focus due to a change in a zoom lens position or movement of the subject.

The camera equipped with the auto focus function generally causes micro vibration of the focus lens in an optical axis direction near the in-focus position (hereinafter, referred to as wobbling operation) to thereby detect the direction for focusing according to a change in an auto focus evaluation value and then move the focus lens in this direction.

In a rough classification, the auto focus function includes an active system and a passive system. The active system is a system in which distance to the subject is detected based on time until a reflected wave of e.g. infrared or ultrasound, which is delivered to the subject, returns and irradiation angle to the subject. The passive system is a system in which the distance to a subject is detected based on an optical image obtained by light reception by a lens.

Examples of the passive system include a phase difference detection system and a contrast detection system. The phase difference detection system is a system in which the optical image obtained by light reception is separated by a separator lens and a defocus amount (amount of separation from the in-focus position) calculated from the phase difference thereof is employed as a control value of an auto focus control to minimize defocus amount.

The contrast detection system is a system in which a contrast signal of a picture signal obtained by imaging by an imaging element is detected and employed as an evaluation value of the auto focus control. The evaluation value is controlled to maximize the contrast signal. This contrast detection system requires no dedicated component for the auto focus control, and therefore is widely employed generally in the cameras such as surveillance cameras and camcorders.

The contrast detection system utilizes characteristics that the subject picture comes into focus at a higher degree when high-frequency components of the picture signal existing at e.g. a contour part when the subject is imaged become larger. This is equivalent to that luminance level difference between a bright part and a dark part of a contour part of the subject, i.e. the contrast, becomes larger. Therefore, to focus a desired subject, the focus lens is moved in such a direction that the high-frequency components of the picture signal become larger.

The contrast detection system is referred to also as a hill climbing system. When the focus lens is moved and the contrast signal is obtained from a picture signal arising from imaging at each focus lens position, the peak (hill) of the contrast signal is a correct focus position. In the contrast detection system, this contrast signal is employed as the auto focus evaluation value and the focus lens is moved as if climbing the peak (hill). Therefore, this system is referred to as the hill climbing system.

In patent document 1, an invention is described in which focusing accuracy is enhanced by allowing focus lens speed to be variable depending on a ratio of a focal point evaluation value in a predetermined time and change amount of lens position.

In patent document 2, an invention is described in which the auto focus evaluation value is corrected based on a high-luminance count value (ratio of high-luminance image) and the in-focus point is identified based on the corrected value.

In patent document 3, an invention is described in which two filters having different cut-off frequency characteristics are used and focus lens movement speed (or movement amount) is set depending on the ratio of two focal point evaluation values to enhance the focusing accuracy.

In patent document 4, an invention is described in which the wobbling amplitude is increased to enhance the focusing accuracy when a focal point evaluation value at start of wobbling operation is determined small and a comparative angle change is also small.

PRIOR-ART DOCUMENT

Patent Document

Patent document 1: JP-7-007650-A
Patent document 2: JP-2005-122016-A
Patent document 3: JP-2006-064970-A
Patent document 4: JP-2006-301031-A

SUMMARY OF THE INVENTION

Problems to be Solved by the Invention

In the contrast detection system, when a subject with a point light source such as a night scene is shot, the luminance of the point light source easily reaches a saturation level and a false peak called "pseudo-hill" is easily generated as well. A slope of the hill of the contrast signal is gentle in many cases as a result. The gentle slope causes a problem that makes it difficult to detect the correct focus position.

In the case of enhancing the cut-off frequency of a high pass filter to detect the contrast signal to address this difficulty, the peak of the contrast signal (hill of auto focus evaluation value) is generated only near the in-focus position. Due to this, there is a problem that it is difficult to detect the correct focus position at positions except near the in-focus position when a subject with low contrast is shot.

An object of the present invention is to provide an imaging device enabling the auto focus operation to be correctly performed for various subjects.

Means for Solving the Problems

To solve the above-described problems and achieve the object of the present invention, a configuration is made as follows.

Specifically, the present invention provides an imaging device that images a subject, the imaging device comprising: a focus lens that collects a light beam from the subject and forms an image of the subject, a drive section that drives the focus lens in optical axis direction, an imaging section that performs photoelectric conversion on the light beam collected by the focus lens and outputs a video signal, a contrast signal generator that extracts a first high-frequency component from the video signal and integrates the first high-frequency component to generate and output a first contrast signal, an auto focus controller that employs the first contrast signal as an evaluation value and moves the focus lens to an in-focus position with wobbling the focus lens by the drive section, and a histogram signal generator that generates and outputs a histogram signal of the video signal, wherein the auto focus controller varies amplitude of the wobbling of the focus lens based on the histogram signal output by the histogram signal generator.

Other measures will be described in Modes for Carrying out the Invention.

Advantages of the Invention

With the present invention, the imaging device enabling the auto focus operation to be correctly carried out for various subjects can be provided.

BRIEF DESCRIPTION OF THE DRAWINGS

FIGS. 3(a) to 3(d) are diagrams showing an example of the auto focus operation when a focus lens group is distant from the in-focus position for a subject having the point light source in the present embodiment.

FIGS. 5(a) to 5(c) are diagrams showing an example of the auto focus operation when the focus lens group is distant from the in-focus position for a subject on which an influence of the point light source is strong in the present embodiment.

FIGS. 7(a) to 7(c) are diagrams showing characteristics of the contrast signals in the present embodiment.

MODES FOR CARRYING OUT THE INVENTION

Modes for carrying out the present invention will be described in detail below with reference to the drawings.
(Configuration of Present Embodiment)

Figure 1:
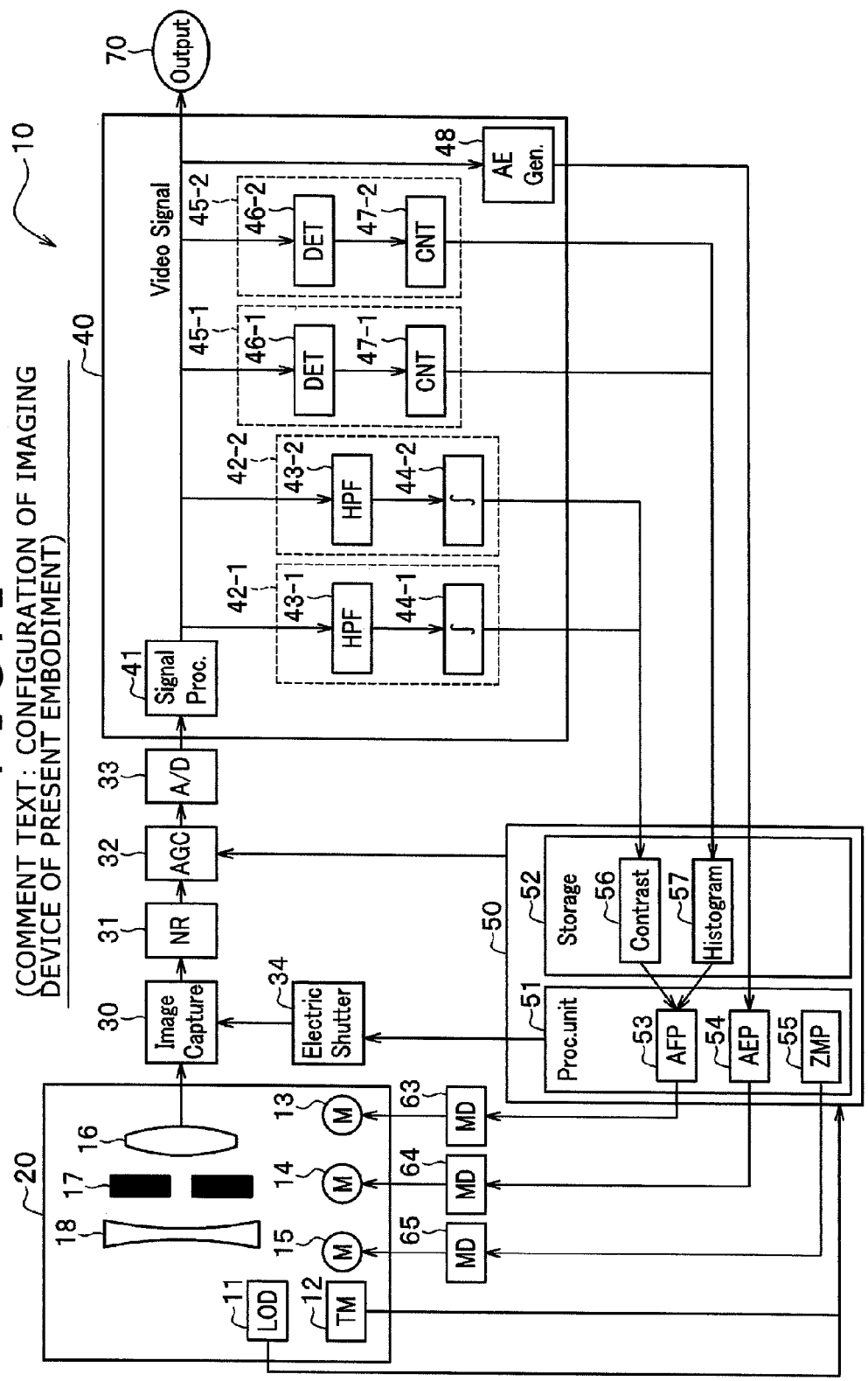
FIG. 1 is a diagram showing the configuration of the imaging device in the present embodiment.

FIG. 1 is a diagram showing the configuration of an imaging device in the present embodiment.

An imaging device 10 has a lens unit 20, an imaging element 30, a noise reduction circuit (NR) 31, an automatic gain controller (AGC) 32, an analog to digital converter (A/D) 33, an electronic shutter 34, a camera signal processor 40, a microcomputer section 50, and motor driver circuits 63 to 65.

The lens unit 20 has a lens origin detector (LOD) 11, a thermometer circuit (TM) 12, a focus motor 13, a diaphragm motor 14, a zoom motor 15, a focus lens group 16, a diaphragm mechanism 17, and a zoom lens group 18. The lens unit 20 forms an optical image of a subject on a light receiving surface of the imaging element 30.

The focus lens group 16 is driven by the focus motor 13 forward and backward in the optical axis direction and adjusts the focus of the optical image of the subject. The focus lens group 16 collects the light beam from the subject and forms the optical image of the subject on the light receiving surface of the imaging element 30 to be described later.

The diaphragm mechanism 17 adjusts the light beam received by this lens unit 20 through opening/closing of diaphragm blades (not shown) by the diaphragm motor 14 to thereby adjust brightness of the optical image of the subject.

The zoom lens group 18 is driven by the zoom motor 15 forward and backward in the optical axis direction and varies the magnification of the optical image of the subject.

The lens origin detector 11 is connected to the microcomputer section 50 and is formed of e.g. a photo-interrupter. The lens origin detector 11 detects the lens origin position of the focus lens group 16 at the time of activation and transmits the detection result to the microcomputer section 50 as lens origin position information of the focus lens group 16. The microcomputer section 50 calculates a comparative position of the focus lens group 16 from a motor control signal to be given to a motor driver circuit 63 based on this lens origin position information and carries out driving control of the focus lens group 16 based on this position information.

Similarly, the lens origin detector 11 detects the lens origin position of the zoom lens group 18 at the time of activation and transmits the detection result to the microcomputer section 50 as lens origin position information of the zoom lens group 18. The microcomputer section 50 calculates the comparative position of the zoom lens group 18 from the motor control signal to be given to the motor driver circuit 65 based on this lens origin position information and carries out driving control of the zoom lens group 18 based on this position information.

The thermometer circuit 12 is connected to the microcomputer section 50 and is formed of e.g. a diode. The thermometer circuit 12 detects the temperature of the inside of the lens unit 20 and transmits the detection result to the microcomputer section 50 as temperature information of the lens unit 20. Based on this temperature information, the microcomputer section 50 calibrates the focus position of the focus lens group 16 and executes the auto focus control.

The imaging element 30 is provided at back of the lens unit 20 and an optical image formed by the lens unit 20 is input thereto. An output side of the electronic shutter 34 is further connected to the imaging element 30. To this electronic shutter 34, one of output terminals of the microcomputer section 50 is connected. To the automatic gain controller 32, one of the output terminals of the microcomputer section 50 is connected.

The output side of the imaging element 30 is connected to the camera signal processor 40 via the noise reduction circuit 31, the automatic gain controller 32, and the analog to digital converter 33.

The imaging element 30 is e.g. a CCD (Charge Coupled Device) imaging element or a CMOS (Complementary Metal Oxide Semiconductor) imaging element, but is not limited to CCD or CMOS. The imaging element 30 performs photoelectric conversion of the optical image of the subject formed on the light receiving surface and sends out an obtained imaging signal to the noise reduction circuit 31. The noise reduction circuit 31 executes predetermined noise removal processing to the imaging signal output by the imaging element 30. The automatic gain controller 32 automatically amplifies the imaging signal which is input to the optimum level. The analog to digital converter 33 converts the input imaging signal to a digital signal.

The optical image of the subject is subjected to the photoelectric conversion by the imaging element 30 to become the imaging signal. After noise is removed by the noise reduction circuit 31, this imaging signal is automatically amplified to the optimum level by the automatic gain controller 32 and is converted to a digital imaging signal by the analog to digital converter 33 to be output to the camera signal processor 40.

The imaging element 30, the noise reduction circuit 31, the automatic gain controller 32, the analog to digital converter 33, and the camera signal processor 40 belong to the imaging section that performs photoelectric conversion of the light beam collected by the focus lens group 16 and outputs the video signal.

The camera signal processor 40 has a signal processor 41, contrast signal generators 42-1 and 42-2, histogram signal generators 45-1 and 45-2, and an auto exposure signal generator 48.

An input side of the camera signal processor 40 is connected to the signal processor 41. An output side of the signal processor 41 is connected to an output device 70, the contrast signal generators 42-1 and 42-2, the histogram signal generators 45-1 and 45-2, and the auto exposure signal generator 48.

Output sides of the contrast signal generators 42-1 and 42-2 are connected to a contrast buffer 56 to be described later of the microcomputer section 50.

Output sides of the histogram signal generators 45-1 and 45-2 are connected to a histogram buffer 57 to be described later of the microcomputer section 50.

An output side of the auto exposure signal generator 48 is connected to an AE processor 54 to be described later of the microcomputer section 50.

The signal processor 41 performs predetermined signal processing to the digital imaging signal input to the camera signal processor 40 to convert the digital imaging signal to a video signal compliant with a predetermined television system such as NTSC (National Television Standards Committee) standard or PAL (Phase Alternating Line) standard. The video signal resulted from the conversion by the signal processor 41 is utilized by the output device 70.

The auto exposure signal generator 48 generates an AE signal indicating the brightness of this converted video signal. The generated AE signal is output to the AE processor 54 of the microcomputer section 50.

The contrast signal generator 42-1 generates a lower-frequency contrast signal C0 from a luminance component of the video signal. The contrast signal generator 42-2 generates a higher-frequency contrast signal C2 from the luminance component of the video signal.

The lower-frequency contrast signal C0 is a first contrast signal. The higher-frequency contrast signal C2 is a second contrast signal.

The contrast signal generator 42-1 has a high pass filter (HPF) 43-1 and an integral circuit (∫) 44-1. An input side to the contrast signal generator 42-1 is connected to the integral circuit 44-1 via the high pass filter 43-1 and an output side of this integral circuit 44-1 serves as an output side of this contrast signal generator 42-1.

The contrast signal generator 42-1 extracts a high-frequency component of the luminance component via the high pass filter 43-1. The high frequency component is performed with an integral process across the whole screen by the integral circuit 44-1 to generate the lower-frequency contrast signal C0.

The contrast signal generator 42-1 extracts and integrates a first high-frequency component of the video signal to generate and output the first contrast signal.

In a default state, unlike the contrast signal generator 42-1, the contrast signal generator 42-2 extracts the high-frequency component of the luminance component via the high pass filter 43-2 whose cut-off frequency is higher than a cut-off frequency of the high pass filter 43-1. Rest of the configurations of the contrast signal generators 42-1 and 42-2 is same. Because of the characteristics, the contrast signal generator 42-2 generates the higher-frequency contrast signal C2. The configuration is so made that the arbitrary setting values can be selected as the cut-off frequencies of the high pass filters 43-1 and 43-2.

The contrast signal generator 42-2 extracts a second high-frequency component that is higher in frequency than the first high-frequency component from the luminance component of the video signal. Then, the second high-frequency component is performed with an integral process to generate the second contrast signal.

The histogram signal generator 45-1 has a high-luminance pixel detector circuit (DET) 46-1 and a pixel counter circuit (CNT) 47-1. An input side to the histogram signal generator 45-1 is connected to the pixel counter circuit 47-1 via the high-luminance pixel detector circuit 46-1 and an output side of this pixel counter circuit 47-1 serves as an output side of this histogram signal generator 45-1.

Out of the luminance component the histogram signal generator 45-1 detects pixels whose luminance is equal to or higher than predetermined luminance by the high-luminance pixel detector circuit 46-1. The detected pixels are counted by the pixel counter circuit 47-1 to generate a high-luminance pixel count Hb as the histogram signal. The configuration is so made that an arbitrary value can be selected as a detection threshold at the time of detecting the high-luminance pixels by the high-luminance pixel detector circuit 46-1. The histogram signal here refers to the number of pixels having luminance in a predetermined range out of the video signal.

The histogram signal generator 45-2 has a same configuration as the histogram signal generator 45-1 except for having a low-luminance pixel detector circuit 46-2 different from the high-luminance pixel detector circuit 46-1 of the histogram signal generator 45-1.

Out of the luminance component the histogram signal generator 45-2 detects pixels whose luminance is equal to or lower than predetermined luminance by the low-luminance pixel detector circuit 46-2. The detected pixels are counted by the pixel counter circuit 47-2 to generate a low-luminance pixel count Hd as the histogram signal. The configuration is so made that an arbitrary value can be selected as the detection threshold at the time of detecting the low-luminance pixels by the low-luminance pixel detector circuit 46-2.

The histogram signal generators 45-1 and 45-2 generate and output the histogram signal of the luminance component of the video signal.

The microcomputer section 50 has a control section 51 and a memory section 52. The control section 51 has an AF processor 53, the AE processor 54, and a zoom processor 55. The memory section 52 has the contrast buffer 56 and the histogram buffer 57.

To the contrast buffer 56, the output sides of the contrast signal generators 42-1 and 42-2 are connected. The contrast buffer 56 is connected to the AF processor 53.

To the histogram buffer 57, the output sides of the histogram signal generators 45-1 and 45-2 are connected. The histogram buffer 57 is connected to the AF processor 53.

The AF processor 53 is connected to the motor driver circuit 63 and drives the focus motor 13 to execute the auto focus control. The AF processor 53 employs the first contrast signal, for example, as an evaluation value and moves the focus lens group 16 to the in-focus position with wobbling by the drive section.

The AE processor 54 is connected to the motor driver circuit 64 and drives the diaphragm motor 14 for an automatic exposure control. To the AE processor 54, the output side of the auto exposure signal generator 48 is connected.

The zoom processor 55 is connected to the motor driver circuit 65 and drives the zoom motor 15 for a zoom control.

To the microcomputer section 50, an output side of the above-described lens origin detector 11 and an output side of the thermometer circuit 12 are connected. One of the output terminals of the microcomputer section 50 is connected to the electronic shutter 34.

The microcomputer section 50 is realized by e.g. a central processing device such as a CPU (Central Processing Unit), and storage devices like a RAM (Random Access Memory) and a ROM (Read Only Memory). Functions of the memory section 52 are realized by the storage devices such as the RAM and the ROM. Functions of the control section 51 are realized through readout of a software program recorded in the ROM into the RAM, and the program run by the CPU.

The motor driver circuits 63 to 65 are circuits to drive the focus motor 13, the diaphragm motor 14, and the zoom motor 15, respectively, and have a control circuit and an amplifier. The motor driver circuits 63 to 65 each have a normal rotation/reverse rotation, terminal and a drive terminal as input terminals and a pulse output terminal as an output terminal, and are each connected to the output terminal of the above-described microcomputer section 50.

The motor control signal is a signal to order the rotation direction of the motor and a signal to order the drive torque of the motor. The microcomputer section 50 drives the motor in a desired rotation direction with predetermined torque by outputting the signal to order the rotation direction to the normal rotation/reverse rotation terminal and, outputting the signal to order the drive torque to the drive terminal. Furthermore, the microcomputer section 50 controls rotation amount and rotation speed by counting a pulse output from the pulse output terminal.

The motor driver circuit 63 is connected to the focus motor 13. The motor driver circuit 64 is connected to the diaphragm motor 14. The motor driver circuit 65 is connected to the zoom motor 15.

The focus motor 13 drives the focus lens group 16 forward and backward in the optical axis direction to adjust the focus of the optical image of a subject.

The diaphragm motor 14 opens and closes the diaphragm blades (not shown) of the diaphragm mechanism 17 to adjust the amount of light beam received by this lens unit 20.

The zoom motor 15 drives the zoom lens group 18 forward and backward in the optical axis direction to vary the magnification of the optical image of a subject.

The motor driver circuit 63 and the focus motor 13 are the drive section that drives the focus lens group 16 in the optical axis direction.

(Operation of Present Embodiment)

The operation of the imaging device 10 will be described based on FIG. 1.

The AF processor 53 acquires the lower-frequency contrast signal C0, the higher-frequency contrast signal C2, the high-luminance pixel count Hb, and the low-luminance pixel count Hd and employs one of the lower-frequency contrast signal C0 and the higher-frequency contrast signal C2 as the auto focus evaluation value in accordance with a predetermined condition to be described later. Furthermore, the AF processor 53 detects the direction for focusing and an in-focus position Pp based on the auto focus evaluation value, theoretical data position on a trace curve according to the zoom lens position at the time, corrected data position by lens adjustment, and temperature information.

The AF processor 53 generates the motor control signal based on this detection result and transmits the result to the motor driver circuit 63. The motor driver circuit 63 performs driving control of the focus motor 13 based on the motor control signal to move the focus lens group 16 in the optical axis direction for the auto focus control.

The AE processor 54 calculates an automatic exposure evaluation value based on information including an AE signal indicating brightness of the video being presently shot, degree of opening of the diaphragm mechanism 17 of the lens unit 20, shutter speed of the electronic shutter 34, and gain of the automatic gain controller 32. The AE processor 54 generates the motor control signal based on this automatic exposure evaluation value and transmits the value to the motor driver circuit 64. The motor driver circuit 64 performs driving control of the diaphragm motor 14 based on the motor control signal to open and close the diaphragm blades (not shown) of the diaphragm mechanism 17 for the automatic exposure control.

The zoom processor 55 performs the zoom control based on a signal from a zoom button (not shown) or control data transmitted from a computer (not shown). The zoom processor 55 generates the motor control signal based on information including lens absolute position information from the lens origin detector 11, zoom magnification information representing the present zoom magnification, and information on the temperature in the lens unit 20 given from the thermometer circuit 12 of the lens unit 20, and transmits the motor control signal to the motor driver circuit 65.

The motor driver circuit 65 performs driving control of the zoom motor 15 based on the motor control signal to move the zoom lens group 18 in its optical axis direction for the zoom control.

Based on the above-described automatic exposure evaluation value, the control section 51 of the microcomputer section 50 controls the shutter speed of the electronic shutter 34 so that the exposure time of the imaging element 30 may be increased/decreased. It thereby adjusts the light amount of the optical image of a subject formed on the light receiving surface of the imaging element 30.

The control section 51 of the microcomputer section 50 controls the gain of the automatic gain controller 32 based on the above-described automatic exposure evaluation value. It thereby adjusts the amplification factor of the imaging signal.

Figure 2:
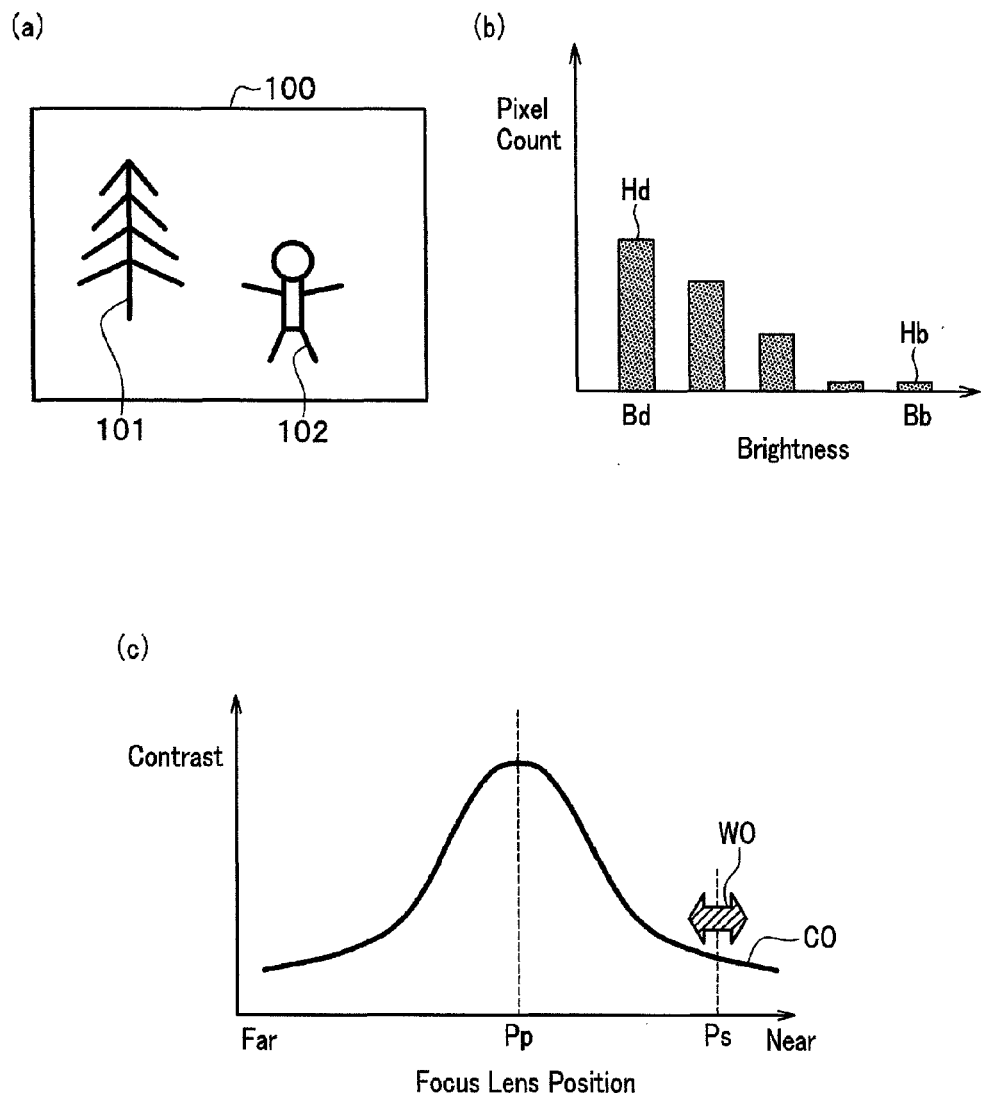
FIGS. 2(a) to 2(c) are diagrams showing an example of the auto focus operation for a normal subject in the present embodiment.

FIGS. 2(a) to 2(c) are diagrams showing an example of auto focus operation for a normal subject in the present embodiment.

FIG. 2(a) is a diagram showing a picture 100.

In this picture 100, subjects 101 and 102 are captured but the point light source is not captured.

FIG. 2(b) is a histogram of a luminance component of the picture 100. An ordinate axis of FIG. 2(b) shows the number of pixels in each range of the luminance component and the abscissa axis shows range of the luminance component.

The number of pixels on a low luminance side Bd represents the low-luminance pixel count Hd. The number of pixels on a high luminance side Bb represents the high-luminance pixel count Hb.

In the picture 100 where a point light source is not captured, a high-luminance pixel does not exist yet many pixels in a range from intermediate luminance to low luminance exist.

FIG. 2(c) is a diagram showing a relationship between the contrast signal and the focus lens position.

An ordinate axis of FIG. 2(c) shows the lower-frequency contrast signal C0 and the abscissa axis shows the focus lens position. The vicinity of the origin of the abscissa axis indicates a position at which a subject on the long distance side (Far) from the imaging device 10 is focused. The vicinity of the right end of the abscissa axis indicates a position at which a subject on the close side (Near) from the imaging device 10 is focused. The in-focus position Pp is the focus lens position at which the subject in the case of FIG. 2(a) is focused. The lower-frequency contrast signal C0 comes to a peak at the in-focus position Pp. An AF start position Ps is the default position of the focus lens position at the start of the auto focus operation. Wobbling amplitude W0 is the default value of the amplitude, of micro vibration of the focus lens group 16 at the start of the auto focus operation.

Even in the case of the AF start position Ps far removed from the in-focus position Pp, the value of the lower-frequency contrast signal C0 on the side of the in-focus position Pp is larger than the value of the lower-frequency contrast signal C0 on the larger defocus side (closer side). Due to this, even when the wobbling amplitude W0 of the focus lens group 16 is small, the AF processor 53 can correctly detect the direction for focusing and can rapidly drive the lens toward the in-focus position Pp.

FIGS. 3(a) to 3(d) are diagrams showing an example of the auto focus operation when the focus lens group is distant from the in-focus position for the subject having the point light source in the present embodiment. The same elements as the diagrams showing the example of the auto focus operation shown in FIGS. 2(a) to 2(c) are given the same symbols.

FIG. 3(a) is a diagram showing a picture 100A.

In this picture 100A, a point light source 110 is further captured in addition to the subjects 101 and 102. In FIG. 3, the focus lens group 16 is distant from the in-focus position Pp and the blur is large on the screen. Thus, the subjects 101 and 102 and the point light source 110 are unclear and an occupancy area of the point light source 110 on the picture 100A is large. In the picture 100A, the luminance component is saturated at the pixels configuring the image of the point light source 110.

FIG. 3(b) is a histogram of a luminance component of the picture 100A. It has the same configuration as the histogram of FIG. 2(b). Furthermore, an inversion threshold Ci and an amplitude threshold Cw are shown for the pixel count on the ordinate axis.

In the picture 100A where the point light source 110 is captured, the luminance component of the pixels configuring the image of the point light source 110 is saturated and therefore the high-luminance pixel count Hb is detected as a large value. When a luminance component of pixels in a predetermined area is saturated, the AE processor 54 narrows the diaphragm mechanism 17 to reduce the light beam and make the whole of the picture 100A slightly darker. The luminance value of the pixels corresponding to the image other than the image of the point light source 110 in the picture 100A decreases thereby and the pixel histogram of the range from intermediate luminance to low luminance moves toward the low luminance side, so that the low-luminance pixel count Hd is detected as a large value.

FIG. 3(c) is a diagram showing the relationship between the contrast signal and the focus lens position. The same configurations as FIG. 2(c) are given the same symbols.

An in-focus near position Pn is the focus lens position near the in-focus position Pp. Wobbling amplitude W1 shows the amplitude of micro vibration of the focus lens group 16 at the in-focus near position Pn. An area A0 will be described in detail with FIG. 3(d) to be described later. The solid line in the graph shows the lower-frequency contrast signal C0 when the point light source 110 is captured. For comparison, the dashed line in the graph shows the lower-frequency contrast signal C0 where the point light source 110 is not captured.

In many cases, the hill characteristics of the lower-frequency contrast signal C0 with a point light source has a gentler slope in the whole region compared with the hill characteristics of the lower-frequency contrast signal C0 without a point light source. When the percentage of the high-luminance pixel area in the picture 100A is increasing, the AE processor 54 narrows the diaphragm mechanism 17 to reduce the light beam and make the whole of the picture 100A slightly darker so as to adjust the luminance value of this high-luminance pixel area to the optimum value. Due to this, the luminance of the subject other than the point light source becomes lower and the slope of the lower-frequency contrast signal C0 becomes gentler as a whole.

The peak value of the lower-frequency contrast signal C0 at the in-focus position Pp decreases because of the decrease in the luminance value of the pixels corresponding to the image other than the image of the point light source 110 due to the point light source 110. In the case of the vicinity of the AF start position Ps and a valley, difference between the value of the lower-frequency contrast signal C0 on the larger defocus side (closer side) and the value of the lower-frequency contrast signal C0 on the focusing side is small. This small difference makes it difficult to correctly detect the direction for focusing.

Furthermore, in many cases, the hill characteristics of the lower-frequency contrast signal C0 with a point light source shows a tendency that the close side (Near) and the long distance side (Far) slightly rise up compared with the hill characteristics of the lower-frequency contrast signal C0 without a point light source. A reason for this will be described below.

The pixels configuring the image of the point light source 110 reach a saturation level surpassing the signal level detectable by the imaging element 30 in many cases. When the focus lens group 16 greatly moves toward the AF start position Ps and the blur is being larger on the screen, the edge part around the point light source (boundary part between the light source and the background) also becomes larger as the area of the point light source becomes larger. Due to this, the lower-frequency contrast signal C0 is detected as a larger value, and the close side (Near) and the long distance side (Far) slightly rise up.

This tendency causes a problem that it becomes more difficult to correctly detect the direction for focusing. A measure to solve this problem will be described with FIG. 5(c) to be described later.

FIG. 3(d) is an enlarged diagram of the area A0 in FIG. 3(c).

When the wobbling amplitude W0 is small, difference between a value V0 of the lower-frequency contrast signal C0 on the focusing side and a value V1 of the lower-frequency contrast signal C0 on the larger defocus side (closer side) cannot be detected, and thus the direction for focusing cannot be detected.

With the wobbling amplitude W1 that is enlarged compared with the wobbling amplitude W0, difference between a value V2 of the lower-frequency contrast signal C0 on the larger defocus side (closer side) and a value V3 of the lower-frequency contrast signal C0 on the focusing side can be detected and therefore the direction for focusing can be correctly detected.

That is, the AF processor 53 as the auto focus controller varies the amplitude of wobbling of the focus lens group 16 based on the histogram signal output by the histogram signal generators 45-1 and 45-2. In this histogram signal, at least the high-luminance pixel count Hb of the video signal is included.

Figure 6:
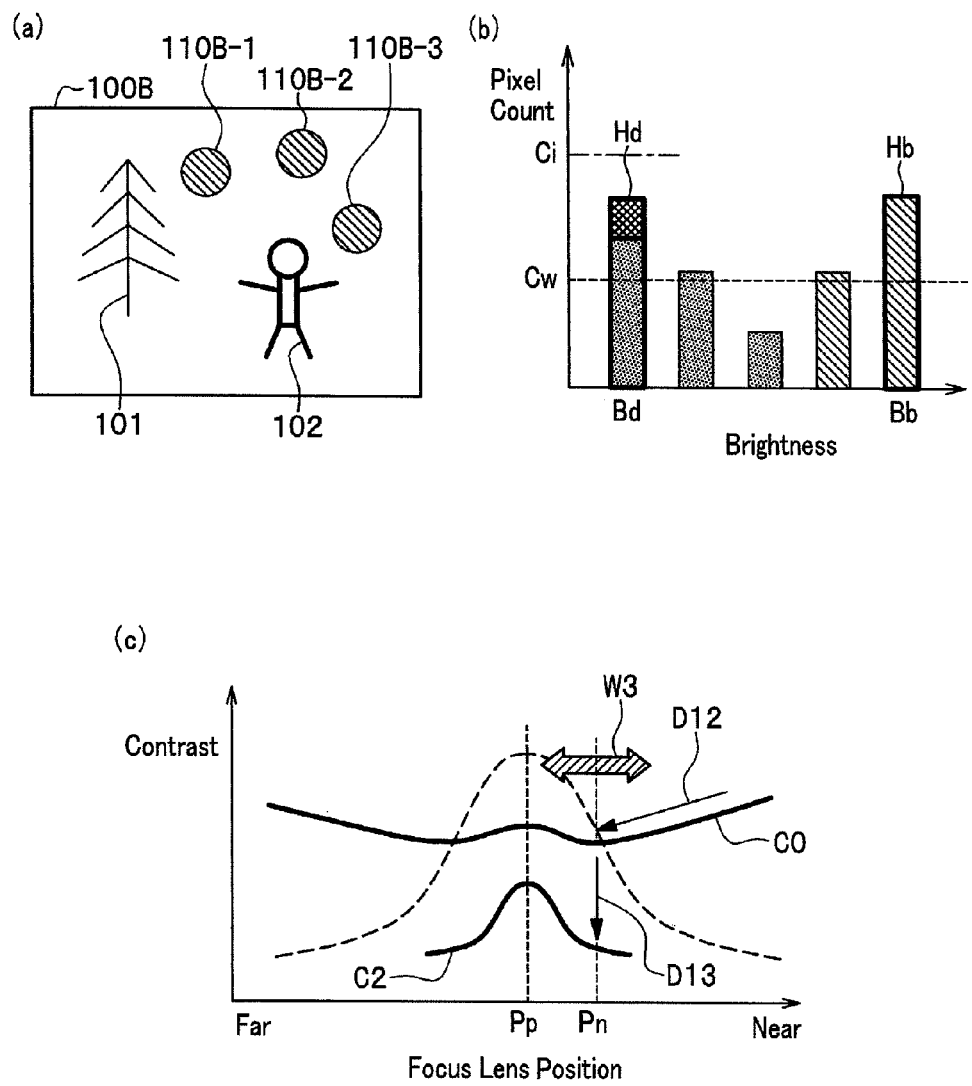
FIGS. 6(a) to 6(c) are diagrams showing an example of the auto focus operation near the in-focus position for a subject on which the influence of the point light source is strong in the present embodiment.

In the present embodiment, because the high-luminance pixel count Hb shown in FIG. 3(b) is equal to or larger than the amplitude threshold Cw as a threshold that switches the wobbling amplitude, the AF processor 53 controls the focus lens group 16 with the wobbling amplitude W1. This allows the direction for focusing to be correctly detected even under the influence of a point light source. However, as shown in FIG. 3(c), the slope of the lower-frequency contrast signal C0 is gentle from the AF start position Ps to the vicinity of the in-focus position Pp. Consequently, the auto focus operation is performed with the enlarged wobbling amplitude W1 after the focus lens group 16 approaches the in-focus near position Pn as well, which causes disturbance on the screen to look conspicuous. A method for addressing this problem will be described with FIG. 6(c) to be described later.

FIGS. 4(a) to 4(c) are diagrams showing an example of the auto focus operation near the in-focus position for a subject having a point light source in the present embodiment.

FIG. 4(a) is a diagram showing the picture 100A. The same elements as the picture 100A shown in FIG. 3(a) are given the same numerals.

In the picture 100A, the point light source 110 is further captured in addition to the subjects 101 and 102. The picture 100A is a picture when the subjects are shot with the focus lens group 16 near the in-focus position Pp. The subjects 101 and 102 and the point light source 110 in the picture 100A are comparatively clear and the occupancy area of the point light source 110 on the picture 100A is small. In the picture 100A, the luminance component is saturated at the pixels configuring the image of the point light source 110.

FIG. 4(b) is a histogram of the luminance component of the picture 100A. The same elements as the histogram of FIG. 3(b) are given the same symbols. Furthermore, a switching threshold Cs is shown for the pixel count on the ordinate axis.

In the picture 100A where the point light source 110 is captured, the luminance component of the pixels configuring the image of the point light source 110 is saturated and therefore the high-luminance pixel count Hb of a predetermined amount is detected. As the image of the point light source 110 becomes clearer, the occupancy area thereof on the picture 100A becomes smaller and thus the high-luminance pixel count Hb decreases. Because the area in which the luminance component of the pixel is saturated becomes smaller, the AE processor 54 opens the diaphragm mechanism 17 to increase the light beam. Consequently, the luminance value of the pixels other than those configuring the image of the point light source 110 in the picture 100A increases and the pixel histogram of the range from intermediate luminance to low luminance moves toward the high luminance side, so that the low-luminance pixel count Hd decreases.

If the high-luminance pixel count Hb is equal to or larger than the switching threshold Cs, the imaging device 10 of the present embodiment determines that the picture 100A is affected by the point light source.

FIG. 4(c) is a diagram showing the relationship between the contrast signal and the focus lens position. The same configurations as FIG. 3(c) are given the same symbols. Wobbling amplitude W2 shows the amplitude of micro vibration of the focus lens group 16 at the in-focus near position Pn.

The lower-frequency contrast signal C0 shows a gentle peak at the in-focus position Pp. At this time, if the focus lens group 16 is located at the in-focus near position Pn, it is possible to carry out control to drive the focus lens group 16 to the in-focus position Pp with the wobbling amplitude W2.

FIGS. 5(a) to 5(c) are diagrams showing an example of the auto focus operation when the focus lens group is distant from the in-focus position for a subject on which the influence of a point light source is strong in the present embodiment. The same elements as the diagrams showing the example of the auto focus operation shown in FIGS. 4(a) to 4(c) are given the same symbols.

FIG. 5(a) is a diagram showing a picture 100B. The same elements as the picture 100A shown in FIG. 4(a) are given the same numerals.

In the picture 100B, a larger number of point light sources 110B-1 to 110B-3 than the point light source 110 in the picture 100A are further captured in addition to the subjects 101 and 102 in the picture 100A.

The picture 100B is a picture shot greatly out of focus when the focus lens group 16 is distant from the in-focus position Pp. The subjects 101 and 102 and the point light sources 110B-1 to 110B-3 in the picture 100B are unclear. Furthermore, an occupancy area of the point light sources 110B-1 to 110B-3 on the picture 100B is larger compared with when they are focused. In the picture 100B, the luminance component is saturated at the pixels configuring the images of the point light sources 110B-1 to 110B-3.

FIG. 5(b) is a histogram of the luminance component of the picture 100B. The same elements as the histogram of FIG. 4(b) are given the same symbols.

In the picture 100B where the point light sources 110B-1 to 110B-3 are captured, the luminance component of the pixels configuring the images of the point light sources 110B-1 to 110B-3 is saturated and therefore the high-luminance pixel count Hb larger than that of FIG. 3(b) is detected. When the luminance component of pixels in a predetermined area is saturated, the AE processor 54 narrows the diaphragm mechanism 17 to reduce the light beam. The luminance value of the pixels configuring the image other than the images of the point light sources 110B-1 to 110B-3 in the picture 100B decreases thereby and the pixel histogram of the range from intermediate luminance to low luminance moves toward the lower region, so that the low-luminance pixel count Hd larger than that of FIG. 3(b) is detected.

FIG. 5(c) is a diagram showing the relationship between the contrast signal and the focus lens position. The same elements as FIG. 4(c) are given the same symbols.

If the auto focus operation starts at the AF start position Ps, the wobbling amplitude enlarges because the slope of the lower-frequency contrast signal C0 at the start of wobbling operation (the amount of change in association with a change in the focus lens position) is small. At this time, the lower-frequency contrast signal C0 on the larger defocus side (closer side) is larger than the C0 on the focusing side. Therefore, there is a fear that the direction for focusing might be erroneously detected and the lens movement might continue toward a larger defocus side D10 to worsen the blur of the picture 100B.

The imaging device 10 as a surveillance camera is required to keep shooting all day. The surveillance camera performs shooting not only during daytime but also during nighttime so that the surveillance camera has a number of opportunities to shoot point light sources such as headlights of cars, and street lamps. Furthermore, frequent usage of the surveillance camera is to shoot subjects of different subject conditions such as subject distance and zoom magnifications in turn by using pan action or tilt action of a swiveling dome mechanism.

When performing a pan action from a subject at a short distance to a subject at a long distance, the imaging device 10 as a surveillance camera starts the auto focus operation from the close side (Near). In such a case, if a subject including a point light source is shot, there is a fear that the surveillance camera could not correctly detect the direction for focusing as described above and the focusing accuracy decreases.

Influence of the point light sources 110B-1 to 110B-3 on the picture 100B appears prominently in the high-luminance pixel count Hb and the low-luminance pixel count Hd when the picture 100B is blurry (focus lens group 16 is greatly distant from the in-focus position Pp). If detecting that the high-luminance pixel count Hb is equal to or larger than the amplitude threshold Cw, the low-luminance pixel count Hd is equal to or larger than the inversion threshold Ci, the high-luminance pixel count Hb increases, and the low-luminance pixel count Hd increases, the imaging device 10 of the present embodiment determines that the slope of the lower-frequency contrast signal C0 is reversed due to the influence of the point light source on the picture 100B. Then, the imaging device 10 inverts the driving direction of the focus lens group 16. In FIG. 5(c), the imaging device 10 inverts the driving direction of the focus lens group 16 from the direction toward the larger defocus side D10 to the direction toward a focusing side D11.

FIGS. 6(a) to 6(c) are diagrams showing an example of the auto focus operation near the in-focus position for a subject on which the influence of a point light source is strong in the present embodiment.

FIG. 6(a) is a diagram showing the picture 100B. The same elements as the picture 100B shown in FIG. 5(a) are given the same numerals.

The picture 100B is a picture shot when the focus lens group 16 is located near the in-focus position Pp. The subjects 101 and 102 and the point light sources 110B-1 to 110B-3 in the picture 100B are clear, and the occupancy area of the point light sources 110B-1 to 110B-3 on the picture 100B is small. In the picture 100B, the luminance component is saturated at the pixels configuring the images of the point light sources 110B-1 to 110B-3.

FIG. 6(b) is a histogram of the luminance component of the picture 100B. The same elements as the histogram of FIG. 5(b) are given the same symbols.

In the picture 100B, the luminance component of the pixels configuring the images of the point light sources 110B-1 to 110B-3 is saturated and therefore the high-luminance pixel count Hb of a predetermined amount is detected. As the images of the point light sources 110B-1 to 110B-3 become clearer, the occupancy area thereof on the picture 100B becomes smaller and thus the high-luminance pixel count Hb decreases. Because the area in which the luminance component of the pixel is saturated becomes smaller, the AE processor 54 opens the diaphragm mechanism 17 to increase the light beam. Consequently, The luminance value of the pixels other than those configuring the images of the point light sources 110B-1 to 110B-3 in the picture 100B increases and the pixel histogram of the range from intermediate luminance to low luminance moves in the higher region direction, so that the low-luminance pixel count Hd decreases.

FIG. 6(c) is a diagram showing the relationship between the contrast signal and the focus lens position. The same elements as FIG. 5(c) are given the same symbols.

Wobbling amplitude W3 shows the amplitude of micro vibration of the focus lens group 16 at the in-focus near position Pn. The higher-frequency contrast signal C2 is generated by the high pass filter 43-2, whose cut-off frequency is higher than the cut-off frequency of the high pass filter 43-1, which generates the lower-frequency contrast signal C0.

The higher-frequency contrast signal C2 has a sharp peak near the in-focus position Pp even under the influence of the point light sources 110B-1 to 110B-3.

If a predetermined condition to be described later is satisfied after lens movement toward a focusing side D12 with the wobbling amplitude W3, the AF processor 53 operates after switching the auto focus evaluation value from the lower-frequency contrast signal C0 to the higher-frequency contrast signal C2 as shown by an arrow D13. This enables the correct auto focus operation for a subject including the point light sources 110B-1 to 110B-3.

In addition to switching the auto focus evaluation value from the lower-frequency contrast signal C0 to the higher-frequency contrast signal C2, the imaging device 10 of the present embodiment switches the wobbling amplitude to the wobbling amplitude corresponding to the higher-frequency contrast signal C2. This allows the focus lens group 16 to operate with the optimum wobbling amplitude when the imaging device 10 approaches the in-focus near position Pn.

FIGS. 7(a) to 7(c) are diagrams showing the characteristics of the contrast signals in the present embodiment.

The ordinate axis of FIGS. 7(a) to 7(c) shows the contrast signal in common, and the abscissa axis shows the focus lens position.

FIG. 7(a) shows the lower-frequency contrast signal C0, a middle-frequency contrast signal C1, and the higher-frequency contrast signal C2 of a subject picture without the point light source.

The lower-frequency contrast signal C0 is detected from a comparatively-low frequency band among the high-frequency components in the video signal (in a state that the edge part in the subject starts being accentuated). The lower-frequency contrast signal C0 has such a slope that its signal level increases toward the in-focus position Pp even at a position slightly distant from the in-focus position Pp, and hits a large hill peak at the in-focus position Pp.

The higher-frequency contrast signal C2 is detected from components with higher frequencies in the video signal (in a state that the edge part in the subject is further accentuated). The higher-frequency contrast signal C2 has such characteristics that its signal level is low at a position slightly distant from the in-focus position Pp and reaches a hill peak only near the in-focus position Pp.

The hill characteristics of the middle-frequency contrast signal C1 is to be located almost in middle between the lower-frequency contrast signal C0 and the higher-frequency contrast signal C2 because the cut-off frequency is set to the middle (middle frequency).

FIG. 7(b) is a diagram showing switching operation of the auto focus evaluation value generally used in the contrast detection system.

By comparing the signal level of the lower-frequency contrast signal C0 with a level threshold TH1 and comparing the signal level of the higher-frequency contrast signal C2 with a level threshold TH2, whether the focus lens group 16 is near the in-focus position Pp can be determined.

Determination condition 1 to determine that the focus lens group 16 is near the in-focus position Pp:
lower-frequency contrast signal C0≥level threshold TH1, and
higher-frequency contrast signal C2≥level threshold TH2.

When determination condition 1 is not satisfied, the microcomputer section 50 determines that the focus lens group 16 is away from the in-focus position Pp by a predetermined distance or longer than the predetermined distance. Then, the microcomputer section 50 employs the lower-frequency contrast signal C0 as the auto focus evaluation value and performs hill climbing operation in such a direction that the signal level of the lower-frequency contrast signal C0 becomes higher as shown by an arrow D20.

When determination condition 1 is satisfied, the microcomputer section 50 determines that the focus lens group 16 is near the in-focus position Pp and switches the auto focus evaluation value from the lower-frequency contrast signal C0 to the higher-frequency contrast signal C2 as shown by an arrow D21.

After switching the auto focus evaluation value to the higher-frequency contrast signal C2, the microcomputer section 50 performs the hill climbing operation in such a direction that the signal level of the higher-frequency contrast signal C2 becomes higher as shown by an arrow D22.

The microcomputer section 50 uses the lower-frequency contrast signal C0 for coarse adjustment of the auto focus control and uses the higher-frequency contrast signal C2 for fine adjustment of the auto focus control. The microcomputer section 50 attempts to enhance the focusing accuracy by switching the auto focus evaluation value from the lower-frequency contrast signal C0 to the higher-frequency contrast signal C2.

FIG. 7(c) is a diagram showing switching operation of the auto focus evaluation value when the slope of the hill characteristics of the lower-frequency contrast signal C0 is gentle due to the influence of the point light source.

The signal level of the lower-frequency contrast signal C0 is totally low and the slope is gentle. At this time, it is possible that the signal level of the lower-frequency contrast signal C0 is always lower than the level threshold TH1 and whether the focus lens group 16 is near the in-focus position Pp cannot be determined with the determination condition 1.

In that case, the threshold compared with the lower-frequency contrast signal C0 is lowered to a level threshold TH3 lower than the level threshold TH1. Furthermore, the threshold compared with the higher-frequency contrast signal C2 is lowered to a level threshold TH4 lower than the level threshold TH2. The imaging device 10 thereby addresses detection of the signal level lowered due to the influence of the point light source.

To correctly detect that the focus lens group 16 is near the in-focus position Pp, moreover, the absolute value of the slope of the lower-frequency contrast signal C0 and the absolute value of the slope of the higher-frequency contrast signal C2 are calculated and compared when the polarity of the slope of the lower-frequency contrast signal C0 corresponds with the polarity of the slope of the higher-frequency contrast signal C2. This is because, near the in-focus position Pp, the slope of the lower-frequency contrast signal C0 is gentle whereas the slope of the higher-frequency contrast signal C2 is comparatively steep.

Determination condition 2 to determine that the focus lens group 16 is near the in-focus position Pp:
lower-frequency contrast signal C0≥level threshold TH3,
higher-frequency contrast signal C2≥level threshold TH4,
the polarity of the slope of the lower-frequency contrast signal C0 corresponds with the polarity of the slope of the higher-frequency contrast signal C2, and
|the slope of the higher-frequency contrast signal C2|≥|the slope of the lower-frequency contrast signal C0|.

When the determination condition 2 is not satisfied, the microcomputer section 50 determines that the focus lens group 16 is away from the in-focus position Pp by a predetermined distance or longer than the predetermined distance. Then, the microcomputer section 50 employs the lower-frequency contrast signal C0 as the auto focus evaluation value and performs the hill climbing operation in such a direction that the signal level of the lower-frequency contrast signal C0 becomes higher as shown by an arrow D30.

When determination condition 2 is satisfied, the microcomputer section 50 determines that the focus lens group 16 is near the in-focus position Pp and switches the auto focus evaluation value from the lower-frequency contrast signal C0 to the higher-frequency contrast signal C2 as shown by an arrow D31. From then on, the microcomputer section 50 performs the auto focus control based on the peak of the higher-frequency contrast signal C2 as shown by an arrow D32. This allows the auto focus operation to be correctly performed even under the influence of the point light source.

When the high-luminance pixel count Hb is equal to or larger than the switching threshold Cs, the imaging device 10 of the present embodiment determines that the contrast signal is affected by the point light source, and switches the condition for determining whether the focus lens group 16 is near the in-focus position Pp.

Figure 8:
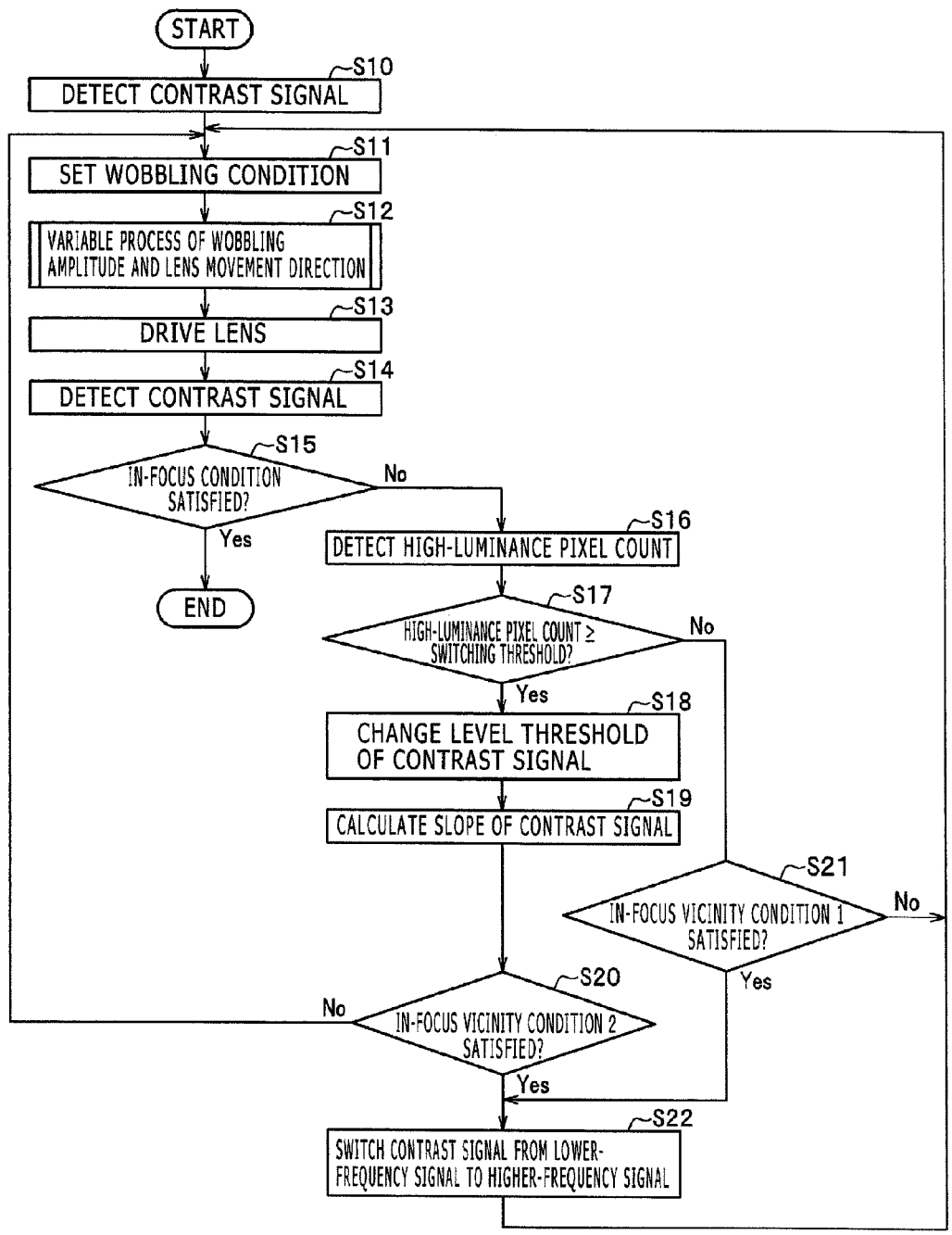
FIG. 8 is a flowchart showing the auto focus control in the present embodiment.

FIG. 8 is a flowchart showing the auto focus control in the present embodiment.

Upon start of the auto focus control processing, in a step S10, the AF processor 53 detects the lower-frequency contrast signal C0 from the high pass filter 43-1 and detects the higher-frequency contrast signal C2 from the high pass filter 43-2. The AF processor 53 can set arbitrary cut-off frequencies to the high pass filters 43-1 and 43-2. In the present embodiment, the AF processor 53 sets the cut-off frequency of the high pass filter 43-1 to a low frequency and sets the cut-off frequency of the high pass filter 43-2 to a high frequency in order to enhance the focusing accuracy when a subject including the point light source is shot.

In a step S11, the AF processor 53 sets a wobbling condition based on whether the presently-selected contrast signal is the lower-frequency contrast signal C0 or the higher-frequency contrast signal C2. The wobbling condition includes e.g. the wobbling amplitude. The default value of the presently-selected contrast signal is the lower-frequency contrast signal C0, and the presently-selected contrast signal is the higher-frequency contrast signal C2 if the contrast signal is switched in a step S22 to be described later.

In a step S12, the AF processor 53 acquires the high-luminance pixel count Hb and the low-luminance pixel count Hd, and then executes varying processing of the wobbling amplitude and inversion processing of the lens movement direction based on the result thereof. Details of the processing of the step S12 will be described in detail with FIG. 9 to be described later.

In a step S13, the AF processor 53 drives the lens. Specifically, the AF processor 53 generates the motor control signal based on the set control parameters and auto focus evaluation value, and transmits the motor control signal to the motor driver circuit 63. The motor driver circuit 63 performs driving control of the focus motor 13, which moves the focus lens group 16 of the lens unit 20 in its optical axis direction, to execute the auto focus control.

In a step S14, the AF processor 53 detects the contrast signal. Furthermore, the AF processor 53 employs the presently-selected contrast signal as the auto focus evaluation value and performs a calculation regarding the auto focus control.

In a step S15, the AF processor 53 determines whether the in-focus condition is satisfied. If the in-focus condition is satisfied (Yes), the auto focus control shown in FIG. 8 ends. If the in-focus condition is not satisfied (No), a step S16 and the subsequent steps are processed. It is when the AF processor 53 detects the peak of the auto focus control value that the in-focus condition is satisfied.

In the step S16, the AF processor 53 acquires the high-luminance pixel count Hb.

In a step S17, the AF processor 53 determines whether the high-luminance pixel count Hb is equal to or larger than the switching threshold Cs. The switching threshold Cs, which is a third pixel count threshold, is aimed at switching the auto focus evaluation value from the lower-frequency contrast signal C0 to the higher-frequency contrast signal C2 near the in-focus position Pp and therefore is selected under a following condition at the time of product design.

Selection condition of the switching threshold Cs as the third pixel count threshold:

point light source condition A (influence degree of point light source: small) as a basis is imaged and the high-luminance pixel count Hb at the in-focus position Pp is measured.

selection condition 1: switching threshold Cs<amplitude threshold Cw selection condition 2: measured high-luminance pixel count Hb≥switching threshold Cs If the high-luminance pixel count Hb is smaller than the switching threshold Cs (No), the AF processor 53 determines that the lower-frequency contrast signal C0 is not affected by the point light source or the influence of the point light source is very small, and executes the processing of a step S21. If the high-luminance pixel count Hb is equal to or larger than the switching threshold Cs (Yes), the AF processor 53 executes the processing of a step S18 after determining that the lower-frequency contrast signal C0 is affected by the point light source, or the influence of the point light source is very large.

In the step S18, the AF processor 53 lowers the threshold compared with the lower-frequency contrast signal C0 to the level threshold TH3 lower than the level threshold TH1. Furthermore, the AF processor 53 lowers the threshold compared with the higher-frequency contrast signal C2 to the level threshold TH4 lower than the level threshold TH2. This allows the imaging device 10 to address detection of the signal level lowered due to the influence of the point light source.

In a step S19, the AF processor 53 calculates the slope of the lower-frequency contrast signal C0 and the slope of the higher-frequency contrast signal C2.

In a step S20, the AF processor 53 determines whether the determination condition 2 of the in-focus vicinity is satisfied. If this condition is not satisfied (No), the AF processor 53 returns to the processing of the step S11. If this condition is satisfied (Yes), the AF processor 53 executes the processing of the step S22.

In the step S21, the AF processor 53 determines whether the determination condition 1 of the in-focus vicinity is satisfied. If this condition is not satisfied (No), the AF processor 53 returns to the processing of the step S11. If this condition is satisfied (Yes), the AF processor 53 executes the processing of the step S22.

In the step S22, the AF processor 53 switches the auto focus evaluation value from the lower-frequency contrast signal C0 to the higher-frequency contrast signal C2 to return to the processing of the step S11.

Figure 9:
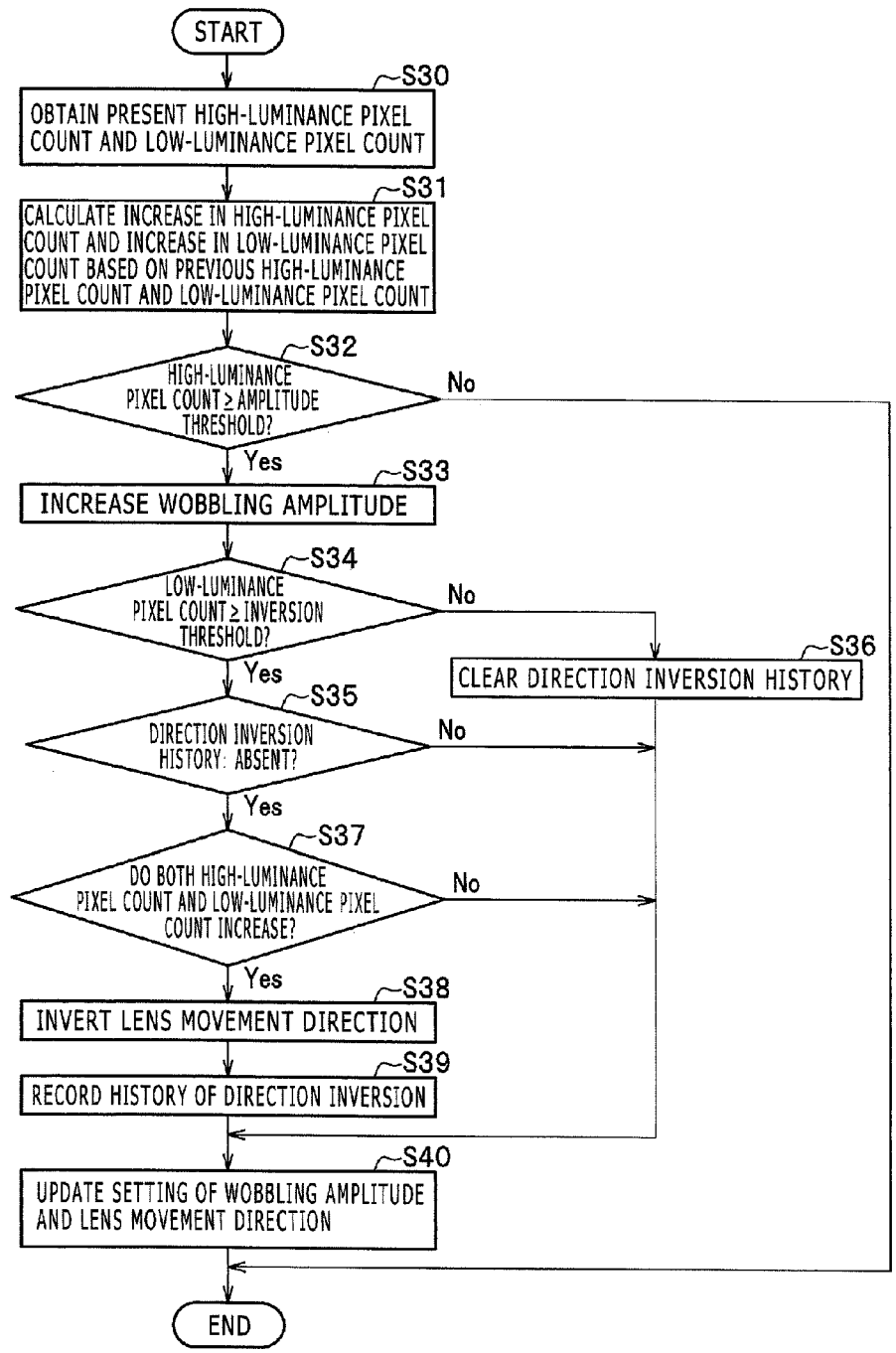
FIG. 9 is a flowchart showing control of the wobbling amplitude and the lens movement direction in the present embodiment.

FIG. 9 is a flowchart showing control of the wobbling amplitude and the lens movement direction in the present embodiment.

Upon start of the processing, in a step S30, the AF processor 53 acquires the present high-luminance pixel count Hb and low-luminance pixel count Hd.

In a step S31, the AF processor 53 calculates difference between the high-luminance pixel count Hb acquired in the step S30 and the previous high-luminance pixel count Hb stored in the histogram buffer 57. The AF processor 53 further calculates difference between the low luminance pixel count Hd acquired in the step S30 and the previous low-luminance pixel count Hd. Moreover, the AF processor 53 stores the present high-luminance pixel count Hb and low-luminance pixel count Hd in the histogram buffer 57.

In a step S32, the AF processor 53 determines whether the high-luminance pixel count Hb is equal to or larger than the amplitude threshold Cw. If the high-luminance pixel count Hb is not equal to or larger than the amplitude threshold Cw, which is the first pixel count threshold (No), the AF processor 53 determines that the point light source is absent in the subject or the influence of the point light source is very small, and ends the processing of FIG. 9 without changing a setting of the wobbling amplitude. If the high-luminance pixel count Hb is equal to or larger than the amplitude threshold Cw (Yes), the AF processor 53 determines that the point light source is present in the subject and its influence is large, and then executes the processing of a step S33.

Figure 4:
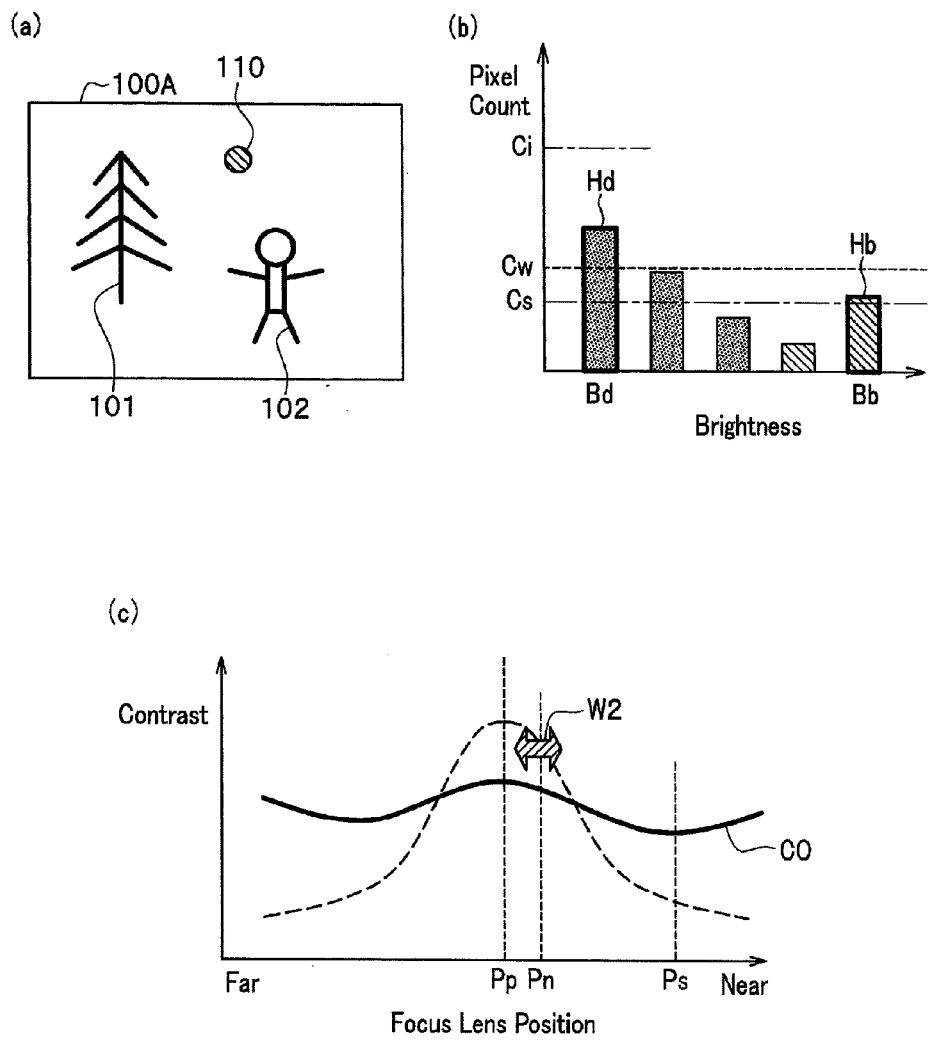
FIGS. 4(a) to 4(c) are diagrams showing an example of the auto focus operation near the in-focus position for a subject having the point light source in the present embodiment.

As shown in the above-described FIG. 4(*c*), near the in-focus position Pp, the high-luminance pixel count Hb is smaller than the amplitude threshold Cw. The determination Of the step S32 does not lead to the processing of setting the wobbling amplitude large. Due to this, near the in-focus position Pp, disturbance on the screen attributed to large wobbling amplitude can be suppressed.

In the step S33, the AF processor 53 increases the wobbling amplitude. As shown in the above-described FIG. 3(*d*), when the wobbling amplitude is small, the value V0 of the contrast signal on the focusing side is almost equal to the value V1 of the contrast signal on the close side and the direction for focusing cannot be correctly detected. However, setting the wobbling amplitude large enables to determine that the value V3 of the contrast signal on the focusing side is larger than the value V2 of the contrast signal on the close side. Thus, the direction for focusing can be correctly detected even when the hill characteristics of the contrast signal are gentle due to the influence of the point light source.

In a step S34, the AF processor 53 determines whether the low-luminance pixel count Hd is equal to or larger than the inversion threshold Ci. If the low-luminance pixel count Hd is not equal to or larger than the inversion threshold Ci (No), the AF processor 53 determines that the present state is where the direction for focusing can be correctly detected similarly to the vicinity of the in-focus position Pp in the above-described FIG. 6(*c*) although the point light source, which affects the contrast signal, is present in the subject. Then, the AF processor 53 executes the processing of a step S36. If the low-luminance pixel count Hd is equal to or larger than the inversion threshold Ci (Yes), the AF processor 53 executes the processing of a step S35.

A case in which the low-luminance pixel count Hd is equal to or larger than the inversion threshold Ci, which is the second pixel count threshold, is where the point light source is present in the subject and control including exposure control is strongly functioning due to the influence of the point light source. The whole screen is greatly darkened by the exposure control at this time and the luminance component of subjects other than the point light source is greatly small, making the slope of the hill of the lower-frequency contrast signal C0 gentle. Therefore, there is a fear that the direction for focusing is erroneously detected similarly at the AF start position Ps in the above-described FIG. 5(*c*).

In the step S36, the AF processor 53 clears the inversion history of the lens movement direction to execute processing of a step S40. The direction inversion processing ends after this processing.

In the step S35, the AF processor 53 determines whether the inversion history of the lens movement direction is absent. If the inversion history of the lens movement direction is absent (Yes), the AF processor 53 executes the processing of a step S37. If the inversion history of the lens movement direction is present (No), the AF processor 53 executes the processing of the step S40.

If the difference in the high-luminance pixel count Hb obtained in the step S31 increases and the difference in the low-luminance pixel count Hd increases in the step S37 (Yes), the AF processor 53 executes the processing of a step S38. At this time, the AF processor 53 determines that the lens is moved based on erroneous detection of the direction for focusing. That is, the conditions that the AF processor 53 inverts the lens movement direction in the processing of FIG. 9 are as follows:

Conditions that the lens movement direction is inverted;
high-luminance pixel count Hb≥amplitude threshold Cw,
low-luminance pixel count Hd≥inversion threshold Ci,
direction inversion history is absent,
difference in the high-luminance pixel count Hb increases, and
difference in the low-luminance pixel count Hd increases.

If the difference in the high-luminance pixel count Hb does not increase or the difference in the low-luminance pixel count Hd does not increase (No), the AF processor 53 executes the processing of the step S40.

In the step S38, the AF processor 53 inverts the lens movement direction with respect to the initial value of the lens movement direction set in the step S12 in the above-described FIG. 8. That is, the AF processor 53 sets not such a direction that the auto focus evaluation value increases but such a direction that the auto focus evaluation value decreases as the lens movement direction.

In a step S39, the AF processor 53 records the history of the direction inversion in the histogram buffer 57 in order to prevent an erroneous setting of the movement direction. This processing and the processing of the step S35 suppress executing the direction inversion processing repeatedly when the direction inversion processing is already being executed.

At the AF start position Ps shown in the above-described FIG. 5(c), the lower-frequency contrast signal C0 on the larger defocus side (closer side) is larger than the lower-frequency contrast signal C0 on the focusing side. At this time, in the hill climbing system based on the lower-frequency contrast signal C0, the lens is driven toward the larger defocus side D10. Furthermore, by inverting the lens movement direction and driving the lens toward the focusing side D11, the lens can be brought close to the in-focus position Pp.

In the step S40, the AF processor 53 updates the wobbling amplitude set in the step S33 and the lens movement direction set in the step S38. The updated values are recorded in the memory section 52 of the microcomputer section 50.

The microcomputer section 50 detects the direction for focusing and the in-focus position Pp based on the auto focus evaluation value. In addition, the microcomputer section 50 generates the motor control signal based on the auto focus control parameters redefined in the step S40 and transmits the motor control signal to the motor driver circuit 63. The motor driver circuit 63 moves the focus lens group 16 in the optical axis direction based on the motor control signal to bring the lens close to the correct in-focus position Pp.

As described above, the AF processor 53 of the imaging device 10 grasps the state of the influence by a point light source on the auto focus and redefines optimum control parameters in the auto focus operation based on the detection result of the high-luminance pixel count Hb and the low-luminance pixel count Hd. In addition, the AF processor 53 performs control operation suitable for the characteristics of the point light source. These actions of the AF processor 53 enable to reduce erroneous determination of the direction for focusing even under a subject condition in which the influence of the point light source is very strong, and to perform the auto focus control with high focusing accuracy.

(Advantages of Present Embodiment)

The above-described present embodiment provides following advantages (A) to (G).

(A) The imaging device 10 of the present embodiment grasps the influence of the point light source on the auto focus and redefines the optimum control parameters in the auto focus operation based on the detection result of the high-luminance pixel count Hb and the low-luminance pixel count Hd. In addition, the imaging device 10 performs control operation suitable for the characteristics of the point light source. This makes it possible to reduce erroneous determination of the direction for focusing even under a subject condition in which the influence of a point light source is very strong, and to perform the auto focus control with high focusing accuracy.

(B) When the high-luminance pixel count Hb is equal to or larger than the switching threshold Cs, the imaging device 10 of the present embodiment determines that the picture is affected by the point light source, and then changes the level thresholds TH1 and TH2, across which the auto focus evaluation value is switched from the lower-frequency contrast signal C0 to the higher-frequency contrast signal C2, to the level thresholds TH3 and TH4, respectively. This makes it possible to reduce erroneous determination of the direction for focusing even under a subject condition in which the influence of the point light source is very strong and to perform the auto focus control with high focusing accuracy.

(C) When the high-luminance pixel count Hb is equal to or larger than the amplitude threshold Cw, the imaging device 10 of the present embodiment determines that the picture is affected by the point light source, and increases the wobbling amplitude. This makes it possible to reduce erroneous determination of the direction for focusing even under a subject condition in which the influence of the point light source is very strong and to perform the auto focus control with high focusing accuracy.

(D) The imaging device 10 of the present embodiment switches the auto focus evaluation value from the lower-frequency contrast signal C0 to the higher-frequency contrast signal C2 and switches the wobbling amplitude to the wobbling amplitude corresponding to the higher frequency contrast signal C2. This allows the focus lens group 16 to operate with the optimum wobbling amplitude when approaching the in-focus near position Pn.

(E) When the high-luminance pixel count Hb is equal to or larger than the amplitude threshold Cw, the low-luminance pixel count Hd is equal to or larger than the inversion threshold Ci, the high-luminance pixel count Hb increases, and the low-luminance pixel count Hd increases, the imaging device 10 of the present embodiment inverts the driving direction of the focus lens group 16 after determining that the slope of the lower-frequency contrast signal C0 is reversed due to the influence of the point light source on the picture. This makes it possible to reduce erroneous determination of the direction for focusing even under a subject condition in which the influence of the point light source is very strong and perform the auto focus control with high focusing accuracy.

(F) When the driving direction of the focus lens group 16 is inverted, the imaging device 10 of the present embodiment records a direction inversion history of the inversion of the lens movement direction and does not invert the lens movement direction again when this direction inversion history is present. This suppresses repeated inversion of the lens movement direction.

(G) When the driving direction of the focus lens group 16 is inverted, the imaging device 10 of the present embodiment records a direction inversion history of the inversion of the lens movement direction and does not invert the lens movement direction again when this direction inversion history is present. Further, this direction inversion history is cleared if the low-luminance pixel count Hd is smaller than the inversion threshold Ci. This deactivates the inversion of the lens movement direction and allows transition to normal auto focus control that detects the peak of the auto focus evaluation value.

(Modification Examples)

The present invention is not limited to the above-described embodiment and can be modified without departing from the gist of the present invention. As this use form and modification example, there are followings (a) to (e).

(a) The imaging device 10 of the present embodiment performs auto focus control with switching between the lower-frequency contrast signal C0 and the higher-frequency contrast signal C2. However, the configuration is not limited thereto. The auto focus control may be performed by switching over among three kinds of contrast signals, i.e. the lower-frequency contrast signal C0, the middle-frequency contrast signal C1, and the higher-frequency contrast signal C2, or may be performed by switching over to further stages.

(b) The contrast signal generators 42-1 and 42-2 of the present embodiment extract the high-frequency component of the luminance component via the high pass filters 43-1 and 43-2, and then perform an integral processing with the high-frequency component across the whole screen by integral circuits 44-1 and 44-2 to generate the lower-frequency contrast signal C0 and the higher-frequency contrast signal C2. The histogram signal generators 45-1 and 45-2 detect the high-luminance pixel count Hb and the low-luminance pixel count Hd across the whole screen. However, the configuration is not limited thereto. The contrast signal generators 42-1 and 42-2, the histogram signal generators 45-1 and 45-2, and the AE processor 54 may be configured to perform only the processing related to this auto focus area. This allows focusing on only a predetermined area on the screen. In addition, the processing load can be greatly reduced as well since the processing with only a part of the screen is enough.

(c) When the high-luminance pixel count Hb is equal to or larger than the switching threshold Cs, the imaging device 10 of the present embodiment determines that the picture is affected by the point light source, and changes the level thresholds TH1 and TH2, across which the auto focus evaluation value is switched over from the lower-frequency contrast signal C0 to the higher-frequency contrast signal C2, to the level thresholds TH3 and TH4, respectively. However, the configuration is not limited thereto. The imaging device 10 may change only the level threshold TH1, across which the auto focus evaluation value is switched over from the lower-frequency contrast signal C0 to the higher-frequency contrast signal C2, to the level threshold TH3. Due to this reason, it is only needed to operate the level threshold TH3 of the lower-frequency contrast signal C0 on which the influence of a point light source is very strong. Thus, the auto focus control with high focusing accuracy can be easily performed.

(d) When the high-luminance pixel count Hb is equal to or larger than the amplitude threshold Cw, the low-luminance pixel count Hd is equal to or larger than the inversion threshold Ci, the high-luminance pixel count Hb increases, and the low-luminance pixel count Hd increases, the imaging device 10 of the present embodiment inverts the driving direction of the focus lens group 16 after determining that the slope of the lower-frequency contrast signal C0 is reversed due to the influence of the point light source on the picture. However, the configuration is not limited thereto and following configuration may be employed. Specifically, the imaging device 10 counts the number of intermediate-luminance pixels that are not included in the high-luminance pixels and the low-luminance pixels, and are in an intermediate luminance region. When the high-luminance pixel count Hb is equal to or larger than the amplitude threshold Cw, the intermediate-luminance pixel count is equal to or larger than a predetermined threshold, and the intermediate-luminance pixel count decreases, the imaging device 10 inverts the driving direction of the focus lens group 16 after determining that the slope of the lower-frequency contrast signal C0 is reversed due to the influence of the point light source on the picture. This reduces the conditions of determining whether to invert the driving direction of the focus lens group 16, and the processing load can be reduced as a result.

(e) The imaging device 10 of the present embodiment switches the auto focus evaluation value from the lower-frequency contrast signal C0 to the higher-frequency contrast signal C2, and also switches the wobbling amplitude to the wobbling amplitude corresponding to the higher-frequency contrast signal C2. However, the configuration is not limited thereto. The imaging device 10 may switch the wobbling amplitude to a small wobbling amplitude when determining that the focus lens group 16 is near the in-focus position Pp based on the value and slope of the lower-frequency contrast signal C0. Due to this, even if only the lower-frequency contrast signal C0 is employed as the auto focus evaluation value, the focus lens group 16 can be operated with the optimum wobbling amplitude when approaching the in-focus position Pp.

(f) The imaging device 10 of the present embodiment generates the lower-frequency contrast signal C0, the higher-frequency contrast signal C2, the high-luminance pixel count Hb, and the low-luminance pixel count Hd from the luminance component of the video signal. However, the configuration is not limited thereto. The imaging device 10 may generate the lower-frequency contrast signal C0, the higher-frequency contrast signal C2, the high-luminance pixel count Hb, and the low-luminance pixel count Hd from a G (Green) pixel value (luminance component) of the video signal composed of three colors of RGB (Red Green Blue). This allows the above-described signals to be generated easily with a lesser load compared with generating the above-described signals from the luminance component calculated from the video signal composed of three colors of RGB.

DESCRIPTION OF NUMERALS

10 imaging device
13 focus motor (drive section)
14 diaphragm motor (drive section)
15 zoom motor (drive section)
16 focus lens group (focus lens)
17 diaphragm mechanism
18 zoom lens group
20 lens unit
30 imaging element
34 electronic shutter
40 camera signal processor
41 signal processor
42-1, 42-2 contrast signal generator
45-1, 45-2 histogram signal generator
50 microcomputer section
51 control section
52 memory section, 53 AF processor (auto focus controller)
54 AE processor
55 zoom processor
56 contrast buffer
57 histogram buffer
63 to 65 motor driver circuit (drive section)
100, 100A, 100B picture
101, 102 subject
Pp in-focus position
Ps AF start position
Bb high-luminance histogram value
Bd low-luminance histogram value
Pn in-focus near position
Cw amplitude threshold (first pixel count threshold)
Ci inversion threshold (second pixel count threshold)
Cs switching threshold (third pixel count threshold)
C0 lower-frequency contrast signal (first contrast signal)
C2 higher-frequency contrast signal (second contrast signal)
Hb high-luminance pixel count
Hd low-luminance pixel count
TH1 to TH4 level threshold

The invention claimed is:

1. An imaging device that images a subject, the imaging device comprising:
   a focus lens that collects a light beam from the subject and forms an image of the subject;
   a drive section that drives the focus lens in optical axis direction;
   an imaging section that performs photoelectric conversion of the light beam collected by the focus lens and outputs a video signal;
   a contrast signal generator that extracts a first high-frequency component from the video signal and integrates the first high-frequency component to generate and output a first contrast signal;
   an auto focus controller that employs the first contrast signal as an evaluation value and moves the focus lens to an in-focus position with wobbling of the focus lens by the drive section; and
   a histogram signal generator that generates and outputs a histogram signal relating to luminance and a pixel count in the video signal;
   wherein the auto focus controller varies amplitude of the wobbling of the focus lens based on the histogram signal output by the histogram signal generator.

2. The imaging device according to claim 1, wherein the histogram signal includes at least a high-luminance pixel count of the video signal.

3. The imaging device according to claim 2, wherein the auto focus controller increases the wobbling amplitude if the high-luminance pixel count counted by the histogram signal generator is greater than or equal to a first pixel count threshold.

4. The imaging device according to claim 1, wherein the histogram signal includes at least a high-luminance pixel count and a low-luminance pixel count of the video signal.

5. The imaging device according to claim 4, wherein the auto focus controller inverts movement direction of the focus lens in auto focus operation if the high-luminance pixel count counted by the histogram signal generator is greater than or equal to a first pixel count threshold, the low-luminance pixel count is greater than or equal to a second pixel count threshold, and the high-luminance pixel count and the low-luminance pixel count both increase.

6. The imaging device according to claim 1, wherein the contrast signal generator further generates a second contrast signal by extracting a second high-frequency component higher in frequency than the first high-frequency component from the video signal and performing an integral,
   at start of auto focus operation, the auto focus controller employs the first contrast signal as the evaluation value and moves the focus lens to the in-focus position with wobbling of the focus lens by the drive section, and
   when the first contrast signal is greater than or equal to a first signal threshold and the second contrast signal is greater than or equal to a second signal threshold, the auto focus controller switches the contrast signal to employ the second contrast signal as the evaluation value from then on.

7. The imaging device according to claim 6, wherein the first signal threshold and the second signal threshold are switched over based on the histogram signal.

8. The imaging device according to claim 7, wherein the auto focus controller switches at least the first signal threshold if the high-luminance pixel count counted by the histogram signal generator is greater than or equal to a third pixel count threshold.

9. The imaging device according to claim 6, wherein when the first contrast signal is greater than or equal to the first signal threshold and the second contrast signal is greater than or equal to the second signal threshold, the auto focus controller switches the contrast signal to employ the second contrast signal as the evaluation value from then on and sets wobbling amplitude corresponding to the second contrast signal.

* * * * *